March 12, 1963    H. E. WISTREICH ETAL    3,080,604
APPARATUS FOR GUIDING AND CONVEYING HOGS TO SLAUGHTER
Filed May 3, 1960    2 Sheets-Sheet 2
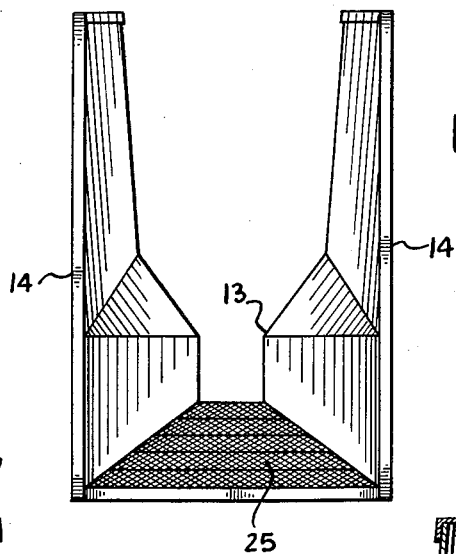
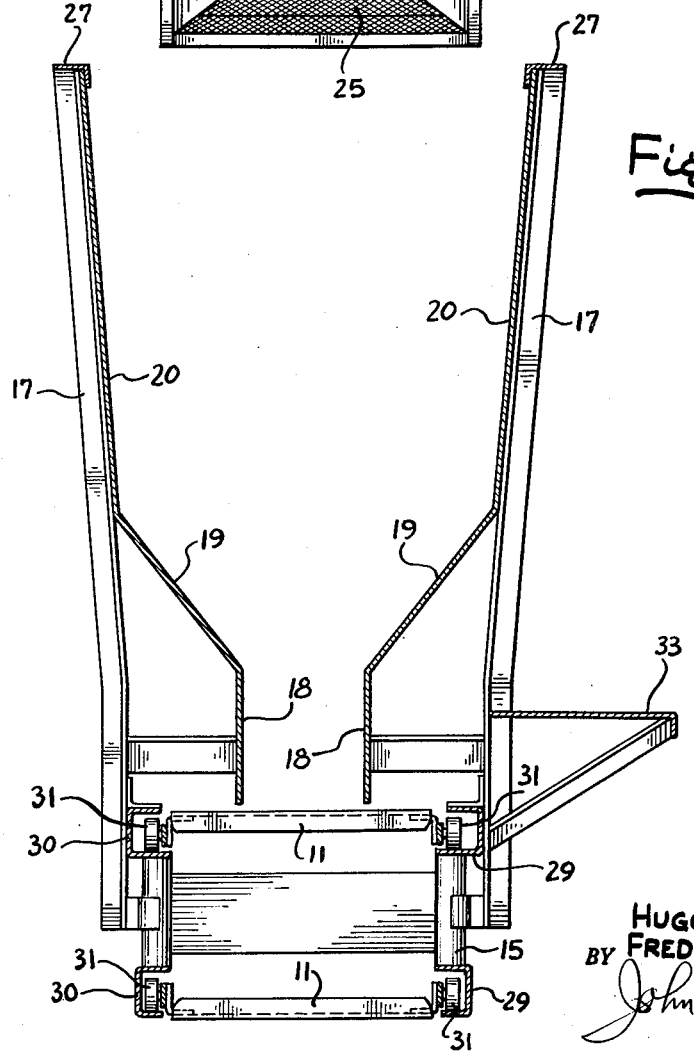
INVENTORS
HUGO E. WISTREICH
FRED A. DI PASQUALE
BY
ATTY.

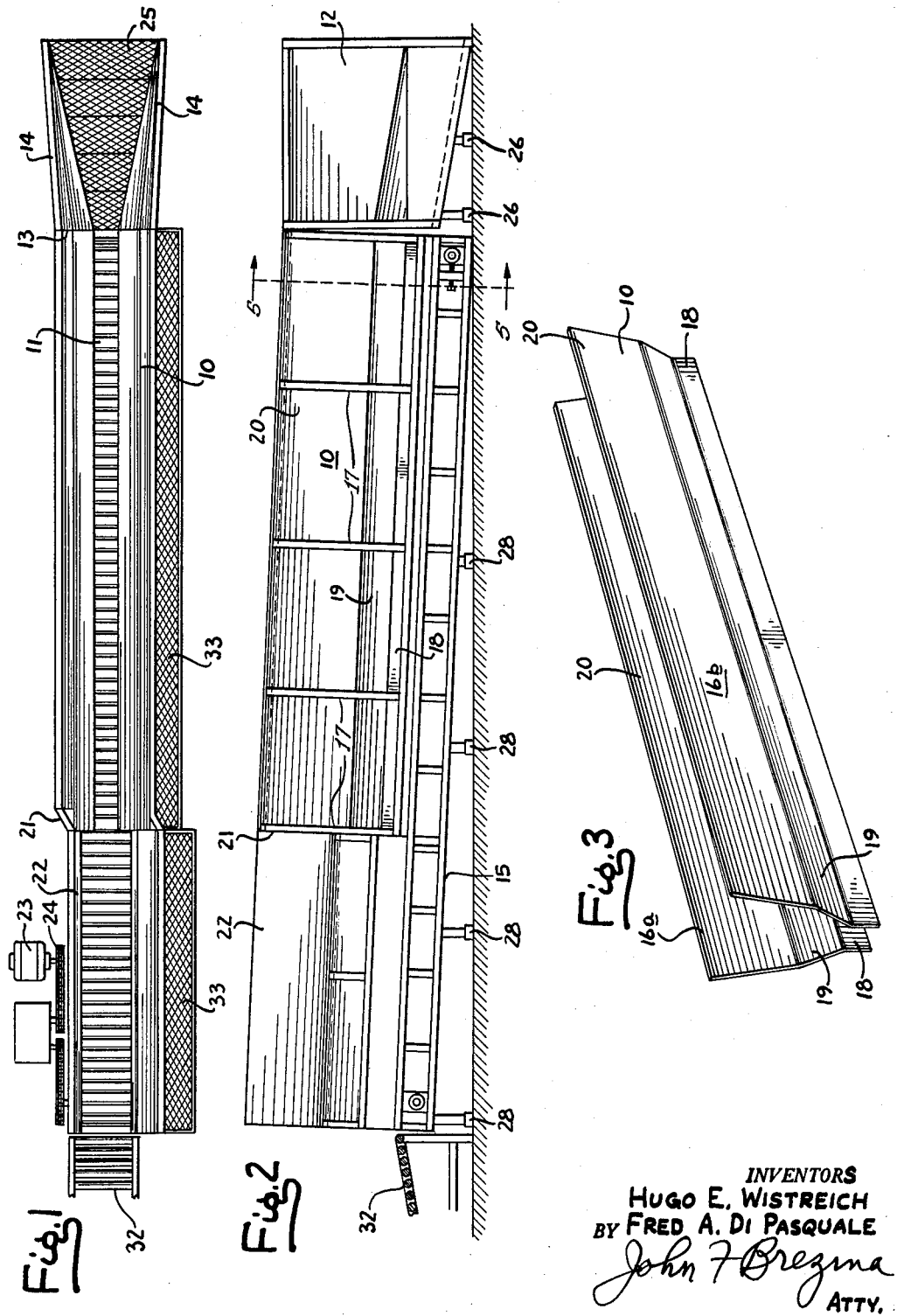

United States Patent Office 3,080,604
Patented Mar. 12, 1963

3,080,604
APPARATUS FOR GUIDING AND CONVEYING HOGS TO SLAUGHTER
Hugo E. Wistreich and Fred A. Di Pasquale, Chicago, Ill., assignors to Reliable Packing Company, Chicago, Ill., a corporation of Illinois
Filed May 3, 1960, Ser. No. 26,633
3 Claims. (Cl. 17—1)

This invention relates to hog conveyors. Particularly, it relates to apparatus for conveying hogs between a hog pen and a stunning section whereby the hogs are brought up to the stunning section in single file.

Much efficiency is lost in the conventional slaughter of hogs by reason of the lack of uniform introduction of the hogs into the stunning section of a hog slaughtering production line. Generally, in a conventional hog slaughtering line the animals are stunned with an electrical current after which they are slaughtered. Thereafter, the carcasses are skinned, and conveyed away for production of meat products.

The animals that enter into the stunning section of a conventional slaughtering line are exceedingly unruly and great confusion reigns in the stunning arena. Efficiency in butchering, therefore, is minimized in proportion to the difficulty of handling the animals immediately prior to stunning.

In accordance with the instant invention, and as an object thereof, there is provided, a device which has a unique conveyor construction for introducing the hogs to be butchered in single file into the stunning arena.

It is a further object of this invention to provide, together with a conveyor, an apparatus which will guide hogs one at a time from hog pen to a stunning arena whereby the hogs may be stunned one at a time as they exit from the apparatus.

It is a further object of the invention to provide an elongated guide for conveying hogs in single file from a pen to a stunning arena in which the apparatus is adapted to preclude turning of the hogs once they have entered thereinto.

Other and further objects of the invention will become apparent from the following description and appended claims, reference being had to the accompanying drawings and numerals of reference thereon.

On the drawings:

FIG. 1 is a top plan view of the apparatus embodying one form of the invention.

FIG. 2 is a side elevation thereof.

FIG. 3 is a perspective view of the hog guide comprising said apparatus.

FIG. 4 is a view thereof from the entrance end,

FIG. 5 is a vertical sectional view thereof taken on a vertical plane indicated by line 5—5 of FIG. 2.

Referring now more particularly to the drawings, the invention is characterized by an apparatus for guiding hogs generally designated as 10. The guide 10 is disposed between a hog pen (not shown), and a stunning arena or section 22. The guide 10 defines a confined path along which hogs are carried single file between the pen and the stunning section.

The guide 10 is disposed above a driven conveyor 11 which may be of roller (as illustrated), belt, or equivalent construction, to insure movement of the hogs between the pen and the stunning area or section 22 having horizontally spaced upwardly extending side walls. There is shown, in FIG. 1, a prime mover 23 and force transmission means 24 for driving conveyor 11.

An entrance section 12 comprising a pair of inwardly converging guide plates 14 provides means for sorting the hogs to single file as they are driven from the pens (not shown) to entrance 13 of guide 10. By reason of the spacing of walls 14 only one hog at a time can enter the guide 10. The entrance section 12 preferably is provided with a roughened floor 25 to provide a steady footing for the hogs. The floor 25, in the embodiment of the invention illustrated, is also sloped upwardly toward entrance 13 for apparent reasons and is carried on a plurality of supports 26.

The apparatus 10 is elongated and it has been found that approximately a 16 foot length is optimal under the conditions experienced in normal hog slaughtering. Throughout its length the apparatus 10 is preferably uniform in cross section. Viewed in cross section, the apparatus 10 is one of a Y-like configuration. Particularly, in the embodiment illustrated, the apparatus comprises a pair of spaced apart plates 16, distinguished from each other by the letters "a" and "b" appended to the numeral 16.

The plates 16a and 16b are secured in position by means of braces or supports 17 which are suitably secured to the outside walls of the guide 10 and supported in frame 15, which is illustrated in FIG. 5. Said plates are suitably secured to the top of apparatus 10 by means of flanged upper rails or rim flanges 27, as illustrated in FIG. 5.

The plates 16 each have a lowermost vertically extending wall 18, intermediate wall portions 19 which extend upwardly and outwardly from the lowermost portion 18 and an uppermost portion 20 which is bent inwardly from the ends of the intermediate portions 19 which, however, diverge slightly from the vertical, as illustrated in the drawings.

In the preferred embodiment of the invention, the lowermost or vertical wall portions 18 of the plates 16a and 16b are disposed parallel to each other, being separated approximately 7¾ inches. The height of the vertical wall portion 18 is about 8 inches. At the widest point of the space between the intermediate wall portions 19, that is, the narrowest space between the uppermost wall portions, the distance is preferably approximately 22¾ inches. The distance from the bottom of the intermediate wall portion to the top thereof, when viewed in cross section, is approximately 12 inches and the distance from the bottom of the uppermost wall portion 19 to the top thereof, when viewed in cross section, is approximately 28 inches, the overall height of apparatus 10 being approximately 4 feet above the conveyor 11.

If desired, and as illustrated herein, the apparatus 10 is sloped upwardly from the entrance position to the exit 21. In this case, of course, the conveyor 11 which forms a floor for the guide 10 is sloped upwardly from entrance 13 to exit 21. To such end frame 15 is mounted on or carried by legs or supports 28, successive of which toward exit 21 are longer than the prior ones.

Small hogs which are to be butchered will fit wholly within the space between the lowermost vertical wall portions 18 whereby they are precluded from turning about once driven into the guide 10. The legs of larger hogs will be accommodated between the vertical wall portions 18 while their bellies will be accommodated along the sloping faces of the intermediate wall portions 19. Inasmuch as the preferred distance between the vertical wall portions 18 is only 7¾ inches, it is impossible for the larger hogs to turn about once they have entered the apparatus. Should they attempt to lift their legs from between the lowermost wall portion 18, the contour of the apparatus will cause their legs to slip down and hold the hogs in an upright position facing in a direction in which they entered the guide 10. The overall height of the device is such that the hogs are unable to get their legs over the top of the device. In this regard, it will be apparent that the apparatus 10 preferably has smooth, solid, flat interior surfaces to prevent the hogs from getting caught and jamming the flow through the apparatus.

By referring to the drawings, it is seen that the frame 15 extends under the stunning section 22. The conveyor 11 also extends under and provides the floor of the apparatus 10, as well as the stunning section 22, so that the hogs are carried on the conveyor from the entrance 13 through exit 21 and into and through the stunning section 22. It will be appreciated that in the preferred form of the invention herein illustrated, the transverse dimension of the stunning section is wider than the spacing between the portions 18 and 19 of the apparatus 10.

A conveyor guide comprising a pair of upper trackways 29 and 30 and a pair of lower trackways 29 and 30 are suitably secured at opposite sides of the conveyor on the sides of which there are suitably mounted a plurality of wheels 31 which ride in the trackways to carry the conveyor 11 in endless circuit.

By thus conveying the hogs in the apparatus described herein, they are conveyed single file out of the exit 21 of the apparatus where they can be stunned and immediately butchered in a conventional fashion. Because the hogs are fed end-to-end into the stunning arena, efficiency in the stunning and slaughtering phase of production is insured and the slaughtering can progress at a uniform rate.

After the hogs are attended in the stunning arena 22 they leave the stunning arena by means of a conveyor 32, shown in FIGS. 1 and 2. To facilitate the proper attendance of the animals in the various portions of the mechanisms herein described, there is provided a walkway 33 which is suitably supported, as illustrated in FIGS. 1 and 5, to permit an operator or attendant access to the animals from above them.

While the foregoing specification sets forth the invention in specific terms, it is to be understood that numerous changes may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

We claim:
1. A conveyor apparatus adapted for use in introducing hogs from a hog pen into a stunning arena in single file comprising frame means, including an upright and longitudinal portions, a floor for said apparatus comprising a driven endless conveyor mounted in said longitudinal portions of said frame; an elongated pair of spaced angularly bent walls secured to the upright portions of said frame and disposed inwardly thereof; and an entrance section disposed at one end of said conveyor and having a pair of walls diverging toward said angularly bent walls and narrowing to the width of a single hog, said walls providing a confined path on said conveyor whereby hogs are carried single file to the stunning arena.

2. A conveyor apparatus adapted for use in slaughtering hogs comprising an elongated frame; a pair of upwardly and outwardly converging offset retaining walls connected on opposite sides of said frame; the upper portions of said side walls being spaced apart a greater distance than the lower parts thereof and forming a guide adapted to restrict movement of hogs in single file on said conveyor; a driven endless conveyor; means for rollably mounting said conveyor on the opposite end portions of said frame including track rails on said frame and a plurality of wheels rotatably connected to said conveyor; an adit connected at the exit end of said conveyor; and a slaughtering section having spaced apart retaining side walls and connected to the exit end portion of said frame, said offset retaining walls extending from said adit to said slaughtering section, said conveyor, when driven, being adapted to move hogs in single file toward said slaughtering section.

3. A conveyor apparatus as defined in claim 2 further characterized by having a plurality of horizontally spaced supports secured to the exterior faces of said offset retaining walls and secured at their lower ends to said frame to thereby brace said walls.

References Cited in the file of this patent

UNITED STATES PATENTS

| 2,185,949 | Regensburger | Jan. 2, 1940 |
| 2,675,783 | Sears | Apr. 20, 1954 |

FOREIGN PATENTS

| 351,773 | Great Britain | July 2, 1931 |